US005979938A

United States Patent [19]
Menjak et al.

[11] Patent Number: 5,979,938
[45] Date of Patent: Nov. 9, 1999

[54] ADJUSTABLE STEERING COLUMN FOR MOTOR VEHICLE

[75] Inventors: Zdravko Menjak; Ratko Manjak, both of Frankenmuth; Jerome Anthony Bartkowiak, Bay City, all of Mich.

[73] Assignee: General Motors Corporation, Detroit, Mich.

[21] Appl. No.: 08/990,395

[22] Filed: Dec. 15, 1997

[51] Int. Cl.$^6$ ........................................ B62D 1/18
[52] U.S. Cl. ................................. 280/775; 74/493
[58] Field of Search .................... 280/775, 779; 74/493

[56] References Cited

U.S. PATENT DOCUMENTS

| | | | |
|---|---|---|---|
| 5,199,319 | 4/1993 | Fujiu | 74/493 |
| 5,527,068 | 6/1996 | Schneider | 280/775 |
| 5,570,610 | 11/1996 | Cymbal | 74/493 |
| 5,769,453 | 6/1998 | Peitsmeier et al. | 280/775 |

Primary Examiner—Eric Culbreth
Assistant Examiner—Stephen Lee

[57] ABSTRACT

An adjustable motor vehicle steering column including a stationary element, an adjustable element supported on the stationary element for relative linear translation, a steering wheel on the adjustable element, an infinitely adjustable primary clamp, and a secondary clamp for preventing relative linear translation of the adjustable element in a collapse direction in the event that the primary clamp is overpowered. The primary clamp includes a pair of depending levers on the stationary element, a pair of bosses on the depending levers, a control shaft spanning the depending levers and rotatable by a control lever, a cam on one of the depending levers, and a follower on the control shaft. The cam and follower flex the depending levers to thrust the bosses against the adjustable element to capture by friction the position of the latter relative to the stationary element. The secondary clamp includes a tubular sleeve on the control shaft having an eccentric lobe which is spring biased against a planar race on the adjustable element. When the primary clamp is overpowered, the onset of relative linear translation of the planar race rotates the sleeve in a direction which progressively more tightly wedges the eccentric lobe against the planar race.

3 Claims, 2 Drawing Sheets

5,979,938

ADJUSTABLE STEERING COLUMN FOR MOTOR VEHICLE

TECHNICAL FIELD

This invention relates to adjustable motor vehicle steering columns.

BACKGROUND OF THE INVENTION

In a motor vehicle steering column characterized as "length-adjustable", a steering wheel is rotatably supported on an adjustable element of the steering column which, in turn, is supported on a stationary element of the steering column for in and out linear translation to vary the length of the steering column and the corresponding horizontal position of the steering wheel. Commonly, the position of the adjustable element relative to the stationary element is releasably captured by a clamp on the stationary element which squeezes against the adjustable element when a control lever is pivoted from an unlocked position to a locked position to induce friction between the stationary element and the adjustable element. Some length-adjustable steering columns include toothed racks on the stationary element and on the adjustable element which overlap each other and which mesh and separate when the control lever is pivoted back and forth between its locked and unlocked positions. The releasable connection afforded by such toothed racks is more robust than the frictional connection achieved by the aforesaid simple clamp. The simple clamp, however, affords infinite adjustability, whereas adjustability achieved by the toothed racks is only in discrete increments corresponding to the pitch of the rack teeth.

SUMMARY OF THE INVENTION

This invention is a new and improved adjustable motor vehicle steering column including a stationary element, an adjustable element supported on the stationary element for relative linear translation, a steering wheel rotatably supported on the adjustable element, an infinitely adjustable primary clamp between the adjustable element and the stationary element, and a secondary clamp for preventing linear translation of the adjustable element in a collapse direction relative to the stationary element in the event that the primary clamp is overpowered. The primary clamp includes a mounting bracket on the stationary element, a pair of depending levers integral with the mounting bracket on opposite sides of the adjustable element, a pair of bosses on the depending levers, a control shaft spanning the depending levers and rotatable by a control lever, a cam on one of the depending levers, and a follower on the control shaft. The cam and follower flex the depending levers to thrust the bosses against the adjustable element to capture by friction the position of the latter relative to the stationary element when the control lever is pivoted from an unlocked position to a locked position. The secondary clamp includes a tubular sleeve on the control shaft having an eccentric lobe which is spring biased against a planar race on the adjustable element. When the primary clamp is overpowered, the onset of linear translation of the planar race rotates the sleeve on the control shaft in a direction which progressively more tightly wedges the eccentric lobe against the planar race to foreclose additional relative linear translation between the adjustable and the stationary elements of the steering column.

DESCRIPTION OF THE PREFERRED EMBODIMENT

Figure 1:
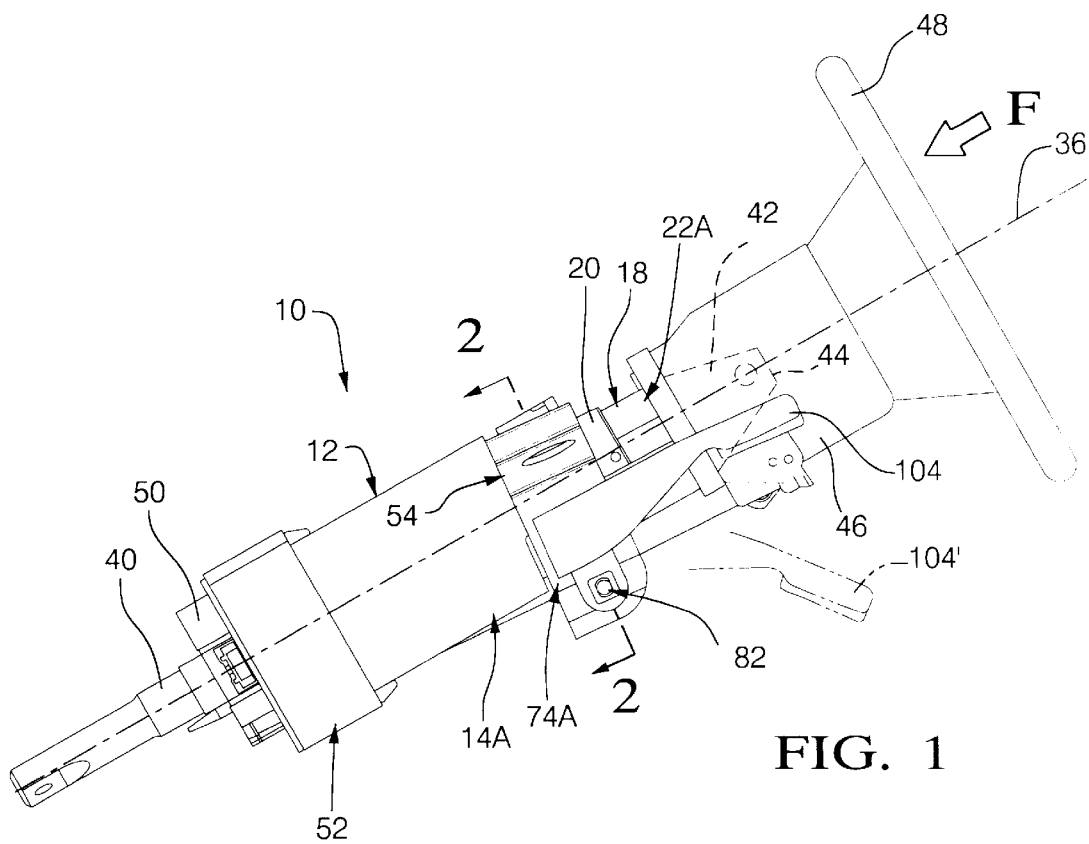
FIG. 1 is an elevational view of an adjustable motor vehicle steering column according to this invention.

An adjustable motor vehicle steering column 10 according to this invention includes a stationary element 12 having a box-shaped cross section defined by a pair vertical side walls 14A, 14B interconnected on top by a horizontal wall 16 and on the bottom by a bottom wall, not shown, parallel to the top wall. An adjustable element 18 of the steering column 10 protrudes telescopically into an aft end 20 of the stationary element. The adjustable element 18 is also box-shaped in cross section and includes a pair of vertical side walls 22A, 22B facing the side walls 14A, 14B of the stationary element, a horizontal top wall 24, and a horizontal bottom wall 26. The side walls 22A, 22B of the adjustable element are reinforced near the bottom wall 26 by a pair of inside linear bosses 28.

A pair of linear grooves 30A, 30B in the side walls 14A, 14B of the stationary element 12 face respective ones of a pair of outside linear bosses 32A, 32B on the side walls 22A, 22B of the adjustable element 18 and cooperate therewith in defining a pair of linear channels 34A, 34B parallel to a longitudinal centerline 36 of the steering column. A plurality of rolling elements 38 in the linear channels 34A, 34B cooperate in supporting the adjustable element 18 on the stationary element 12 for relative linear translation in the direction of the longitudinal centerline 36 of the steering column. A fragmentarily illustrated steering shaft 40 is supported inside of the stationary and the adjustable elements 12, 18 for rotation about the longitudinal centerline 36 and for linear expansion and collapse concurrent with relative linear translation between the stationary element and the adjustable element.

The adjustable element 18 has a pair of lugs 42 at an aft end 44 thereof. A tilt housing, not shown, is concealed inside of a shroud 46 and supported at the aft end of the adjustable element on the lugs 42 for up and down pivotal movement. A steering wheel 48 is rotatably supported on the tilt housing and connected to the steering shaft 40 through a universal coupling, not shown. The vertical position of the steering wheel 48 is adjusted by up and down pivotal movement of the tilt-housing on the aft end of the adjustable element 18. The horizontal position of the steering wheel 48 is adjusted by in and out linear translation of the adjustable element 18 relative to the stationary element 12.

A forward end 50 of the stationary element 12 is surrounded by a box-shaped forward mounting bracket 52 which is rigidly attached by fasteners, not shown, to a body, not shown, of a motor vehicle whereby the forward end of the stationary element is supported vertically on the vehicle body. Releasable hooks, not shown, between the stationary element 12 and the forward mounting bracket 52 prevent linear translation of the stationery element relative to the vehicle body in the direction of the longitudinal centerline 36 of the steering column except in the circumstance of an extraordinary impact on the steering wheel 48 in the direction of a schematically represented vector force "F", FIG. 1. In the latter circumstance, the aforesaid hooks release the stationary element 12 for linear translation through a collapse stroke against a controlled resistance of an energy absorber, not shown, between the stationary element and the vehicle body. For a more complete description of the forward mounting bracket 52 and of an appropriate energy absorber, reference may be made to U.S. Ser. No. 08/808, 204, filed Feb. 28, 1997 and assigned to the assignee of this invention.

An aft mounting bracket 54 is rigidly attached to the stationary element 12 of the steering column at the aft end 20 of the stationary element. The aft mounting bracket 54 includes a lateral beam 56 having a pair of slots 58A, 58B therein opening toward the steering wheel 48. Each slot 58A, 58B has a capsule 60A, 60B slidably mounted therein and retained by a plurality of injection molded plastic pins 62. A pair of schematically represented vertical hangers 64A, 64B on the vehicle body protrude through corresponding ones of a pair of apertures 66 in the capsules. Respective ones of a pair of fasteners 68A, 68B on the vertical hangers 64A, 64B rigidly clamp the corresponding capsules 60A, 60B against a schematically-represented platform 70 on the body of the motor vehicle.

A primary clamp 72 on the steering column includes a pair of depending levers 74A, 74B integral with and depending vertically from the lateral beam 56 of the aft mounting bracket 54 on opposite sides of the stationary element 12. Each of the depending levers 74A, 74B is flexible laterally, i.e., perpendicular to the longitudinal centerline 36 of the steering column, at a living hinge 76. Each of the depending levers 74A, 74B has a boss 78 thereon in a corresponding one of a pair of windows 80A, 80B in the vertical sides 14A, 14B of the stationary element. Each of the bosses 78 faces a corresponding one of the vertical sides 22A, 22B of the adjustable element 18 opposite the inside linear bosses 28. Inward flexure of the depending levers 74A, 74B toward the longitudinal centerline 36 of the steering column squeezes the bosses 78 against the vertical sides 22A, 22B of the adjustable element.

The primary clamp 72 further includes a control shaft 82 spanning the depending levers through respective ones of a pair of bores 84A, 84B in the depending levers 74A, 74B. The control shaft 82 has a screw-threaded first stem 86 at one end and a screw-threaded second stem 88 at the other end. The control shaft 82 is supported on the depending lever 74B in the bore 84B for rotation about a centerline 90 of the control shaft by a screw-threaded, non-rotatable bushing 92. The control shaft 82 is supported on the depending lever 74A in the bore 84A for rotation about the centerline 90 of the control shaft by a non-rotatable cam bushing 94 around a shank portion of the control shaft.

The stationary cam bushing 94 defines a cam 96 around the shank portion of the control shaft. A cam follower 98 is rigidly attached to the control shaft 82 outboard of the cam bushing 94 for rotation as a unit with the control shaft. A plurality of lugs 100 on the cam follower 98 engage the cam 96. A nut 102 on the screw-threaded second stem 88 on the control shaft retains the cam follower on the control shaft. A control lever 104 is rigidly attached to the cam follower 98 for pivotal movement as a unit with the cam follower and the control shaft 82 about the centerline 90 of the control shaft.

The control lever 104 has a locked position, FIG. 1, generally parallel to the longitudinal centerline 36 of the steering column and an unlocked position 104' pivoted clockwise from the locked position and fragmentarily illustrated in broken lines in FIG. 1. In the locked position of the control lever, the lugs 100 on the cam follower 98 seat on high lobes of the cam 96. In the unlocked position of the control lever, the lugs 100 seat on low lobes of the cam.

In the locked position of the control lever 104, the cam 96 and the follower 98 cooperate in flexing the depending levers 74A, 74B at the living hinges 76 toward the centerline 36 of the steering column to clamp the bosses 78 against the vertical sides 22A, 22B of the adjustable element 18 whereby the position of the latter relative to the stationary element is frictionally captured. In the unlocked position 104' of the control lever 104, the cam 96 and the follower 98 cooperate in releasing the depending levers 74A, 74B to separate the bosses 78 from the vertical sides 22A, 22B of the adjustable element for unimpeded linear translation of the adjustable element relative to the stationary element in the direction of the longitudinal centerline 36 of the steering column.

Figure 3:
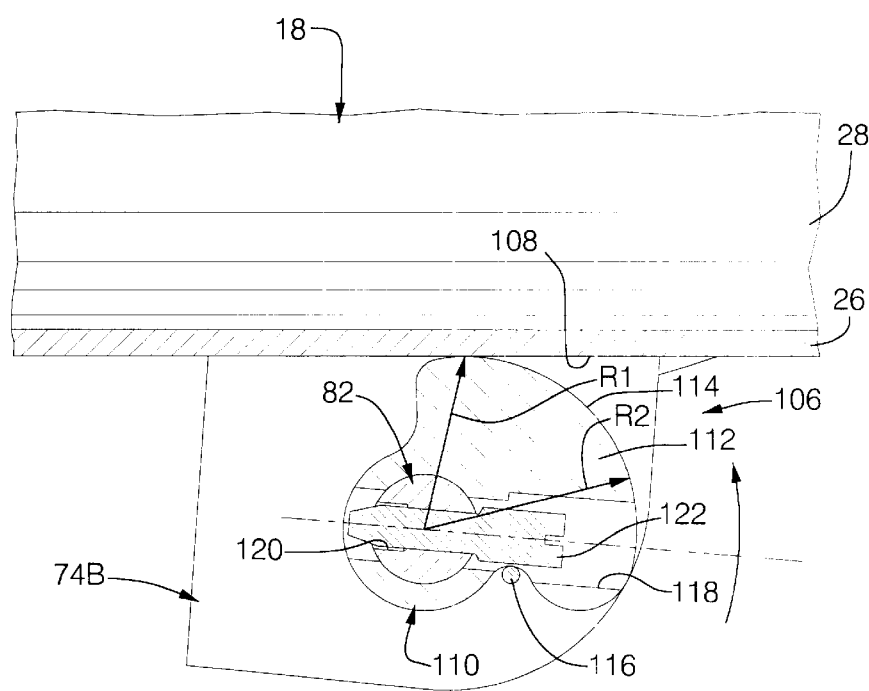
FIG. 3 is a sectional view taken generally along the plane indicated by lines 3—3 in FIG. 2.
Figure 2:
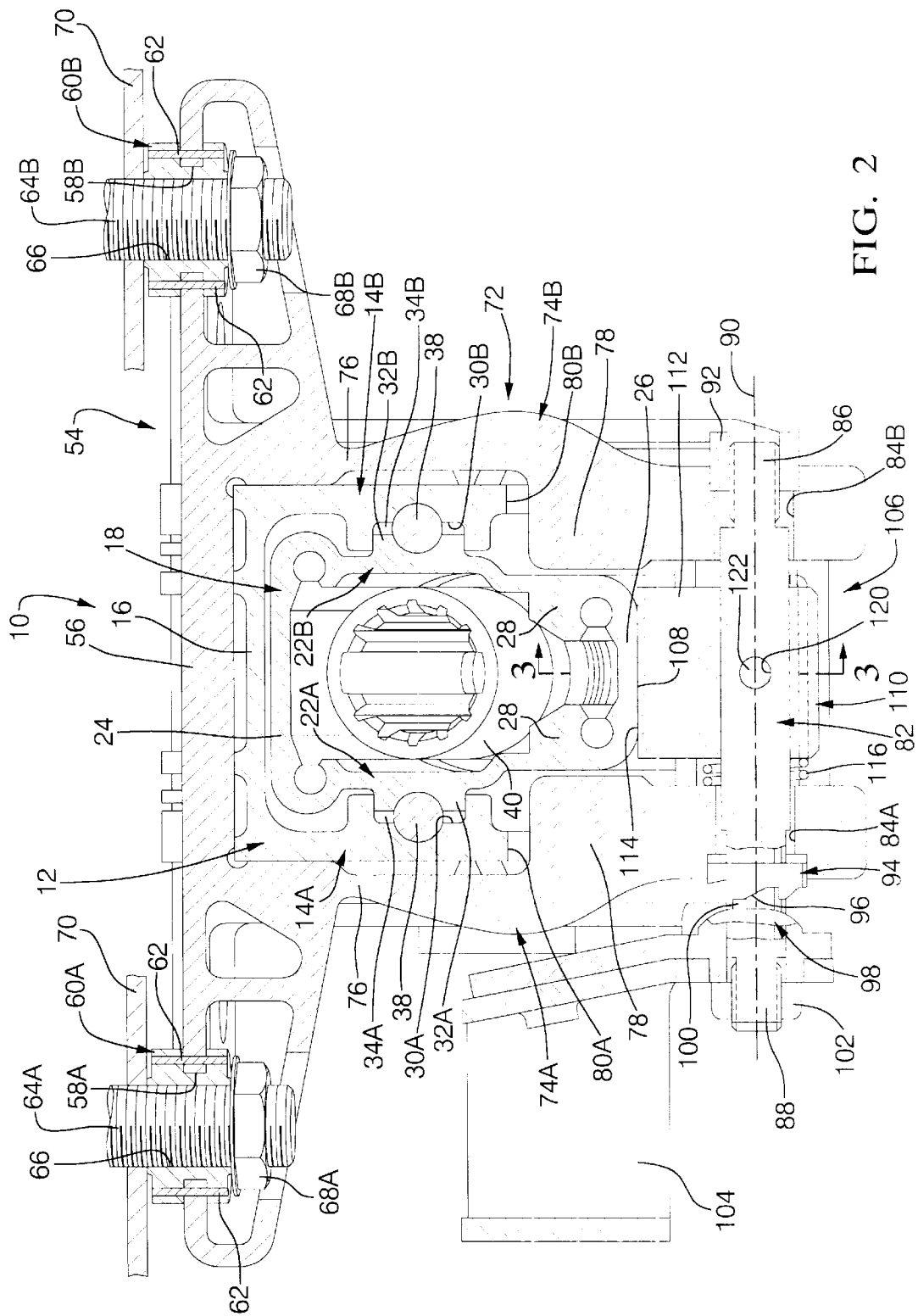
FIG. 2 is a sectional view taken generally along the plane indicated by lines 2—2 in FIG. 1.

A secondary clamp 106 of the steering column 10, FIGS. 2–3, includes a planar race 108 on the adjustable element 18 facing the control shaft 82 and a tubular sleeve 110 rotatably supported on the control shaft between the depending levers 74A, 74B. The sleeve 110 has an eccentric lobe 112 thereon defining an arc-shaped bearing surface 114 facing the planar race 108 on the adjustable element 18. The bearing surface 114 flares outward relative to the centerline 90 of the control shaft from a minimum radius $R_1$ to a maximum radius $R_2$, FIG. 3. A coil torsion spring 116 around the control shaft 82 is hooked to the tubular sleeve and to the control shaft and biases the sleeve counterclockwise, FIG. 3, relative to the control shaft.

The tubular sleeve 110 has a bore 118 therein perpendicular to the centerline 90 of the control shaft and intersected by the control shaft. The bore 118 registers with a screw-threaded cross bore 120 in the control shaft. A stud 122 is screwed into the cross bore 120 in the control shaft and protrudes into the bore 118 in the tubular sleeve. The diameter of the stud 122 is less than the diameter of the bore 118 so that the stud and the bore cooperate in defining a lost motion means operative to rotate the sleeve 110 as a unit with the control shaft when the stud bears against the bore and to permit relative rotation through a limited angular range corresponding to the clearance between the stud and the bore.

In the locked position of the control lever 104, FIGS. 1–3, the primary clamp 72 captures by friction the position of the adjustable element 18 relative to the stationary element 12 as described above. At the same time, the stud 122 is about centered in bore 118 with the bearing surface 114 on the eccentric lobe 112 of the tubular sleeve thrust by the torsion spring 116 against the planar race 108 of the adjustable element. When the control lever 104 is pivoted from its locked position to its unlocked position 104', the depending levers release the bosses 78 from the vertical sides 22A, 22B of the adjustable element. Concurrently, the stud 122 on the control shaft 82 engages the bore 118 in the tubular sleeve after a few degrees of relative pivotal movement of the control shaft and forcibly rotates the sleeve clockwise, FIG. 3, to separate the bearing surface 114 on the eccentric lobe from the planar race 108 on the adjustable element 18.

With the bearing surface 114 separated from the planar race 108, the adjustable element 18 is released from the stationary element for telescopic linear translation to adjust the horizontal position of the steering wheel 48. When a comfortable position of the steering wheel is achieved, the corresponding position of the adjustable element relative to the stationary element is frictionally captured by the primary clamp 72 by pivoting the control lever from its unlocked position 104' to its locked position. At the same time, the spring 116 thrusts the bearing surface 114 on the eccentric lobe 112 of the tubular sleeve against the planar race 108 on the adjustable element.

With the control lever 104 in its locked position, the force of the impact on the steering wheel 48 in the direction represented by the vector force F, FIG. 1, is initially transferred from the adjustable element 18 to the stationary element 12 through the primary clamp 72. The force required to fracture the plastic pins 62 between the capsules 60A, 60B and the aft mounting bracket 54 on the stationary element is calculated to be a small fraction of a force required to overpower the primary clamp. Likewise, the force required to separate the forward end 50 of the stationary element 12 from the box-shaped bracket 52 on the vehicle body is calculated to be a small fraction of the force required to overpower the primary clamp. Accordingly, the force of the impact F initially releases the stationary element 12 of the steering column from the vehicle body for linear translation through the aforesaid collapse stroke in the direction of the longitudinal centerline 36 of the steering column against the controlled resistance induced by the aforesaid energy absorber.

If, after the stationary element 12 is thus released from the vehicle body, the magnitude of the force of the impact F is not sufficient to overpower the primary clamp, the stationary and adjustable elements remain rigidly coupled together and the force of the impact is reacted to the vehicle body through the primary clamp and the energy absorber. If, however, the magnitude of the force of the impact F is sufficient to overpower the primary clamp 72, then the adjustable element 18 commences linear translation in the aforesaid collapse direction relative to the stationary element 12. At the onset of such relative linear translation, the planar race 108 on the adjustable element cooperates with the bearing surface 114 on the eccentric lobe 112 of tubular sleeve 110 in rotating the tubular sleeve further counterclockwise, FIG. 3, to progressively more tightly wedge the eccentric lobe between the control shaft 82 and the adjustable element 18. The tubular sleeve 110 quickly achieves a wedged position, not shown, in which friction between the bearing surface 114 and the planar race 108 positively forecloses additional linear translation of the adjustable element 18 relative to the stationary element 12. In that circumstance, the force of the impact F is reacted through the secondary clamp 106 instead of the primary clamp 72 and then to the vehicle body through the energy absorber.

Having thus described the invention, what is claimed is:

1. An adjustable steering column for a motor vehicle including
   a stationary element,
   an adjustable element supported on said stationary element for relative linear translation in the direction of a longitudinal centerline of said steering column,
   a primary clamp means including a control shaft supported on said stationary element for rotation as a unit with a control lever in a first direction from an unlocked position of said control lever to a locked position of said control lever and in a second direction from said locked position of said control lever to said unlocked position of said control lever,
   said primary clamp means being operative in response to pivotal movement of said control lever from said unlocked position to said locked position to capture by friction the position of said adjustable element relative to said stationary element, and
   a secondary clamp means operative to arrest linear translation of said adjustable element relative to said stationary element when said primary clamp means is overpowered,
   characterized in that said secondary clamp means comprises:
   a planar race on said adjustable element,
   a sleeve rotatably supported on said control shaft,
   a lost motion means operative to rotate said sleeve as a unit with said control shaft and to accommodate rotation of said sleeve relative to said control shaft through a limited angular range,
   an eccentric lobe on said sleeve having an arc-shaped bearing surface flaring radially outward, and
   a spring biasing said sleeve in said first direction of rotation of said control shaft so that said bearing surface on said eccentric lobe is thrust against said planar race on said adjustable element in said locked position of said operating lever,
   said bearing surface cooperating with said planar race in rotating said sleeve in said first direction to progressively more tightly wedge said eccentric lobe between said control shaft and said planar race in response to the onset of linear translation of said adjustable element relative to said stationary element,
   said lost motion means being operative to rotate said sleeve in said second direction of rotation of said control shaft to separate said bearing surface on said eccentric lobe from said planar race in response to rotation of said control shaft in said second direction from said locked position of said control lever to said unlocked position of said control lever.

2. The adjustable steering column for a motor vehicle recited in claim 1 wherein said lost motion means operative to rotate said sleeve as a unit with said control shaft and to accommodate rotation of said sleeve relative to said control shaft through a limited angular range comprises:
   a cross bore in said control shaft,
   a bore in said sleeve aligned with said cross bore in said control shaft, and
   a stud having a diameter less than the diameter of said bore in said sleeve rigidly attached to said control shaft in said cross bore therein and protruding into said bore in said sleeve.

3. The adjustable steering column for a motor vehicle recited in claim 2 wherein said primary clamp means further comprises:
   a lateral beam on said stationary element,
   a pair of depending levers on opposite sides of said stationary element integral with said lateral beam and pivotable laterally relative to said stationary element at respective ones of a pair of living hinges between said pair of depending levers and said lateral beam,
   a boss on each of said depending levers facing a corresponding one of a pair of vertical sides of said adjustable element,
   means operative to rotatably support said control shaft on each of said depending levers, and
   a cam and follower means operative in response to rotation of said control shaft in said first direction from said unlocked position of said control lever to said locked position of said control lever to flex each of said pair of depending levers at corresponding ones of said living hinges toward said longitudinal centerline of said steering column and clamp said bosses against said corresponding vertical sides of said adjustable element.

* * * * *